US010675778B2

United States Patent
Stefani

(10) Patent No.: US 10,675,778 B2
(45) Date of Patent: Jun. 9, 2020

(54) SIZE COMPENSATOR FOR A PRESSING DEVICE

(71) Applicant: SYSTEM S.P.A., Fiorano Modenese (Modena) (IT)

(72) Inventor: Franco Stefani, Sassuolo (IT)

(73) Assignee: SYSTEM CERAMICS S.P.A., Fiorano Modenese (IT)

( * ) Notice: Subject to any disclaimer, the term of this patent is extended or adjusted under 35 U.S.C. 154(b) by 119 days.

(21) Appl. No.: 16/064,962

(22) PCT Filed: Jan. 11, 2017

(86) PCT No.: PCT/IB2017/050119
§ 371 (c)(1),
(2) Date: Jun. 21, 2018

(87) PCT Pub. No.: WO2017/122124
PCT Pub. Date: Jul. 20, 2017

(65) Prior Publication Data
US 2019/0009429 A1    Jan. 10, 2019

(30) Foreign Application Priority Data

Jan. 15, 2016 (IT) .................. 102016000003464

(51) Int. Cl.
*B28B 5/02* (2006.01)
*B28B 3/02* (2006.01)
*B30B 5/06* (2006.01)
*B30B 15/06* (2006.01)
*B29C 43/48* (2006.01)
*B29C 43/22* (2006.01)

(52) U.S. Cl.
CPC .............. *B28B 3/024* (2013.01); *B28B 5/021* (2013.01); *B30B 5/06* (2013.01); *B30B 15/061* (2013.01); *B28B 5/025* (2013.01); *B28B 5/027* (2013.01); *B29C 43/228* (2013.01); *B29C 2043/483* (2013.01)

(58) Field of Classification Search
CPC ........ B28B 3/024; B28B 5/021; B28B 5/025; B28B 5/027; B30B 5/06; B30B 15/061; B29C 43/228; B29C 2043/483
See application file for complete search history.

(56) References Cited

U.S. PATENT DOCUMENTS

| 2,983,983 A | 5/1961 | Mayer |
| 4,025,272 A * | 5/1977 | Camp ............... B27N 3/24 425/324.1 |
| 4,573,404 A * | 3/1986 | Held ................ B30B 5/04 100/151 |

(Continued)

FOREIGN PATENT DOCUMENTS

| EP | 0529214 A2 | 3/1993 |
| EP | 1136211 A1 | 9/2001 |

(Continued)

*Primary Examiner* — James P Mackey
(74) *Attorney, Agent, or Firm* — Pearne & Gordon LLP

(57) ABSTRACT

A format compensator for a pressing device, comprising a compensating element (7) of a given thickness (S), structured so as to be interposed between the lower punch and the upper punch (10, 11) of a pressing device so as to be arranged in contact with the punches (10, 11) during pressing.

17 Claims, 5 Drawing Sheets

(56) References Cited

U.S. PATENT DOCUMENTS

| | | | |
|---|---|---|---|
| 4,714,015 A | * | 12/1987 | Stabler .................... B30B 5/062 |
| | | | 100/154 |
| 4,723,484 A | | 2/1988 | Held |
| 5,303,644 A | | 4/1994 | Held |
| 5,460,764 A | * | 10/1995 | Held ........................ B27N 3/24 |
| | | | 156/555 |

FOREIGN PATENT DOCUMENTS

| | | | |
|---|---|---|---|
| EP | 1500480 | A2 | 1/2005 |
| EP | 1669177 | A2 | 6/2006 |
| FR | 2565155 | A1 | 12/1985 |
| RU | 2606142 | C2 | 1/2017 |
| SU | 575229 | A1 | 10/1977 |
| SU | 1612988 | A3 | 12/1990 |
| WO | WO 2013/050865 | * | 4/2013 |

* cited by examiner

SIZE COMPENSATOR FOR A PRESSING DEVICE

The present invention relates to a format compensator for a pressing device.

The invention relates in particular to a device for pressing ceramic products, devised by the same applicant and known in the art from publication EP150048, in which the powder material to be pressed is arranged in the form of a layer on a bearing plane constituted by the upper face of a continuous conveyor belt which is supported slidably on a pressing member or lower punch. The pressing is carried out with a pressing member or upper punch by means of interposing a continuous loop-wound belt, the external surface whereof is facing towards the continuous conveyor belt.

With the aim of perimetrally delimiting a pressing zone, the upper punch is provided with a frame that projects downwards. As well as perimetrally delimiting the pressing zone, the forming frame also has the task of generating, following the pressing, an edge of the final pressed product characterised by a greater compaction or density than the zones internal of the frame.

The present market for tiles and ceramic slabs requires that multiple format changes can be made. As well as the variability of thickness and surface finishing, market demand is also for varying the dimensions of the slabs to be made. In order to satisfy this need, the applicant has devised an effective system for enabling a rapid change of only the pressing frame, with no need to have to replace the whole upper punch.

A press is usually dimensioned for realising manufactured products having predetermined dimensions. While it is not possible to realise products having larger dimensions than what is predetermined, it is on the other hand possible to realise products having smaller formats. When reducing the format of the product, the overall surface of the layer of ceramic material to be pressed is also reduced, so that the external zones of the punches remain free of ceramic material, while still being subjected to the pressing load. This means that during the pressing step of the material, the zones external of the punches remain free of any abutment and tend to bend, following the significant thrust of the pressing load. This bending is absolutely unacceptable as it produces non-planar surfaces in the manufactured product.

The aim of the present invention is to provide a format compensator and a pressing device that enable obviating the drawbacks of the currently available pressing devices.

An advantage of the format compensator according to the present invention is that it prevents or limits the deformations of the upper punch and the lower punch during the pressing of products having smaller formats.

A further advantage of the pressing device according to the present invention is that it reduces the costs necessary for enabling a format change of the products to be pressed.

Further characteristics and advantages of the present invention will become more apparent in the following detailed description of an embodiment of the present invention, illustrated by way of non-limiting example in the attached figures, in which.

Figure 1:
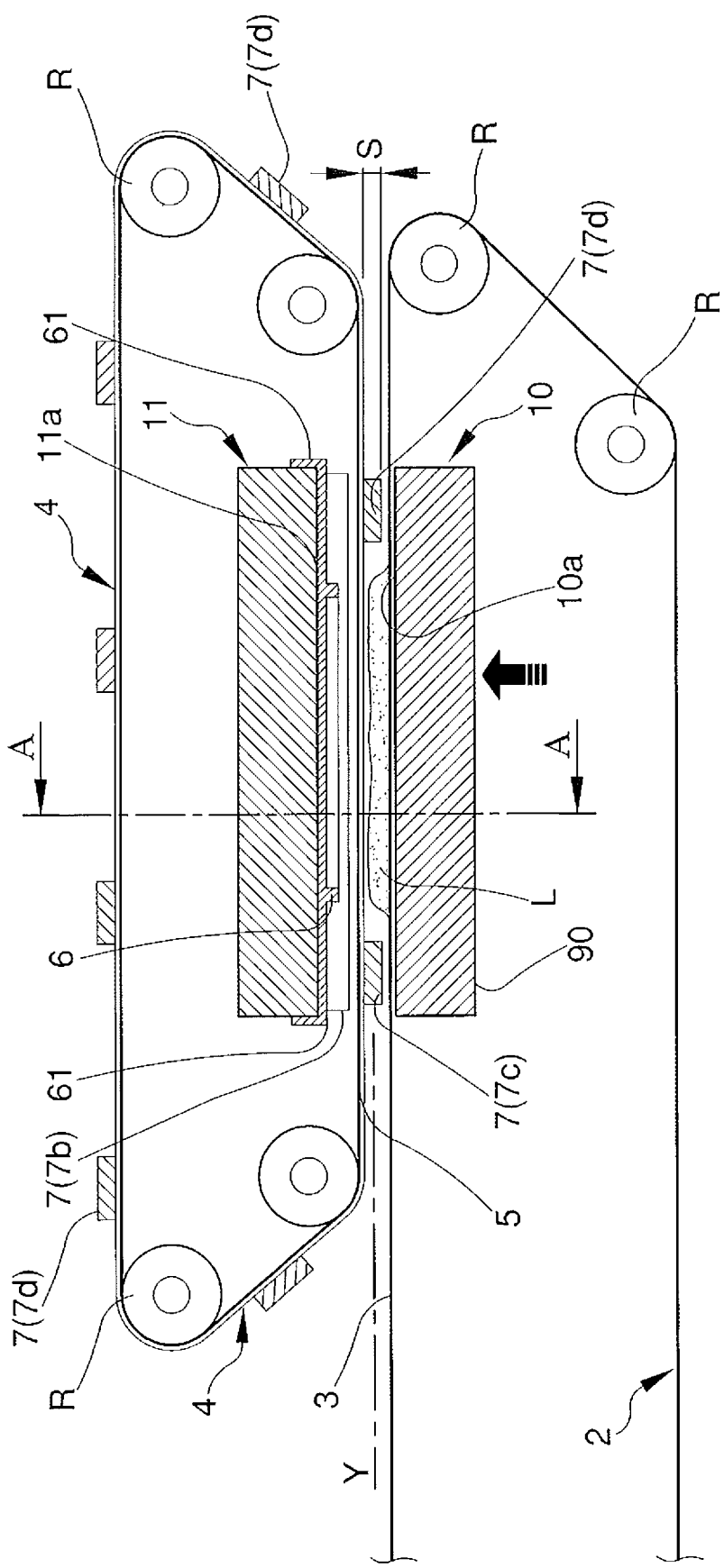
FIG. 1 is a schematic view of the device according to the present invention, seen in cross-section on a vertical plane containing an advancement direction (Y)

With reference to FIG. 1, the pressing device according to the present invention comprises a lower punch (10), provided with a pressing surface (10a) facing upwards, and an upper punch (11) provided with a pressing surface (11a) facing downwards. The two punches are part of a press, not illustrated in detail, by which press they are activated to reciprocally near and distance so as to carry out the pressing of a load (L) of ceramic material deposited in a layer. By way of example, the upper punch (11) might be rigidly constrained to the press, while the lower punch (10) might be mobile by action of an oil-dynamic cylinder (90).

The device further comprises a first movable belt (2), which has an active portion (3) provided with a bearing surface facing upwards. The active portion (3) is at least partially arranged between the upper punch (11) and the lower punch (10). The first movable belt (2) is thus arranged with the active portion (3) thereof above the lower punch (10) and below the upper punch (11). The active portion (3) of the first belt (2) is mobile along an advancement direction (Y) for feeding the layers (L) of material to be pressed into the space comprised between the two punches (10, 11). The loads (L) to be pressed are deposited on the first belt (2) upstream of the two punches, using known means to the person skilled in the art and not illustrated in detail. The first belt (2) is activated by means of rollers (R) arranged in relation to the pathway to be followed, in a known way in the art. The rollers have been only schematically represented in the figures.

The pressing device preferably comprises a second movable belt (4) provided with an active portion (5) arranged at least partially between the first movable belt (2) and the upper punch (11). The active portion (5) of the second movable belt (4) is mobile along the advancement direction (Y) in accordance with the active portion (3) of the first belt (2). At least for a portion arranged at the punches (10, 11), and partially upstream and downstream thereof, the two active portions (3, 5) are both parallel to the advancement direction (Y). The second belt (4) is also activated by means of rollers (R) arranged in relation to the pathway to be followed, in a known way in the art. The rollers have been only schematically represented in the figures.

During the feeding of a load (L) to the press (10, 11), the movable belts (2, 4) move at a controlled velocity. The movable belts (2, 4) preferably move in a synchronised way and at a same velocity. A control device known to the person skilled in the art can be predisposed for the correct relative positioning of the movable belts (2, 4). During this step the punches (10, 11) are separated by a greater distance to allow inlet of the load (L) into the space comprised between the punches. In this configuration the active portions (3, 5) are parallel to one another and are separated by a distance which enables inlet of the load (L), the thickness of which, i.e. the height measured perpendicularly to the bearing surface of the lower active portion (3), is smaller than the distance separating the active portions (3, 5). The second belt (4), at the end of the pressing step, is advanced so as to distance the part of the active portion (5) which previously entered into contact with the load (L), so that it can be cleaned. At the same time a consecutive portion of the second belt (4), which has already undergone the cleaning operations, takes the place of the preceding portion.

The pressing device comprises at least a compensating element (7) of a given thickness (S), which is interposed between the upper punch (11) and the lower punch (10) so as to be arranged, during the pressing, in opposition to the punches (10, 11) in a zone not occupied by the load (L).

The compensating element (7) can be arranged in direct or indirect contact with the punches (10, 11). For example, the compensating element can be arranged in direct contact with one of the two punches, and can be arranged in contact with the other punch with the interposing of one or both the active portions (3, 5) of the movable belts (2, 4).

The compensating element (7) is therefore able to define an abutment between the two punches (10, 11) during the pressing step, in the zones not occupied by the load (L) to be pressed. In fact this prevents the two punches (10, 11) from being subject to deformations in the lateral zones thereof, in particular in cases where the load (L) has a smaller format with respect to the surfaces of the punches (10, 11). In other terms, the presence of the compensating element (7) enables the pressing force of the die to unload more uniformly on the opposite pressing surfaces ($10a$, $11a$), maintaining the pressed slab planar and having an apparent density that is uniform.

The compensating element (7) can be conformed in various ways.

Overall, the compensating element (7) is structured so as to at least partly occupy the zones of the punches (10, 11) left free of the load (L). For example, in the case of a load (L) having a smaller format along all the sides with respect to the maximum pressable force, the compensating element (7) is conformed as a frame so as to surround the load (L). If on the other hand the load (L) has a reduced width (measured in a perpendicular direction to the advancement direction (Y)) the compensating element (7) can be structured in the form of one or two elements parallel to one another and parallel to the advancement direction (Y). If the load (L) has a reduced length (measured along the advancement direction (Y)) the compensating element (7) can be structured in the form of one or two elements parallel to one another and perpendicular to the advancement direction (Y).

The compensating element (7) preferably has a variable thickness (S), so as to be able to adapt to the final thickness (i.e. at the end of the pressing) desired for the load (L). It is understood that the thickness (S) is to be measured along a perpendicular direction to the pressing surfaces ($10a$, $11a$) of the two punches (10, 11). In particular, the thickness (S) of the compensating element (7) must be established in relation to the characteristics of deformability of the material used for realising it. In substance, the compensating element (7) must provide a resistance that is comparable to that of the load (L) during the pressing step.

Figure 7:
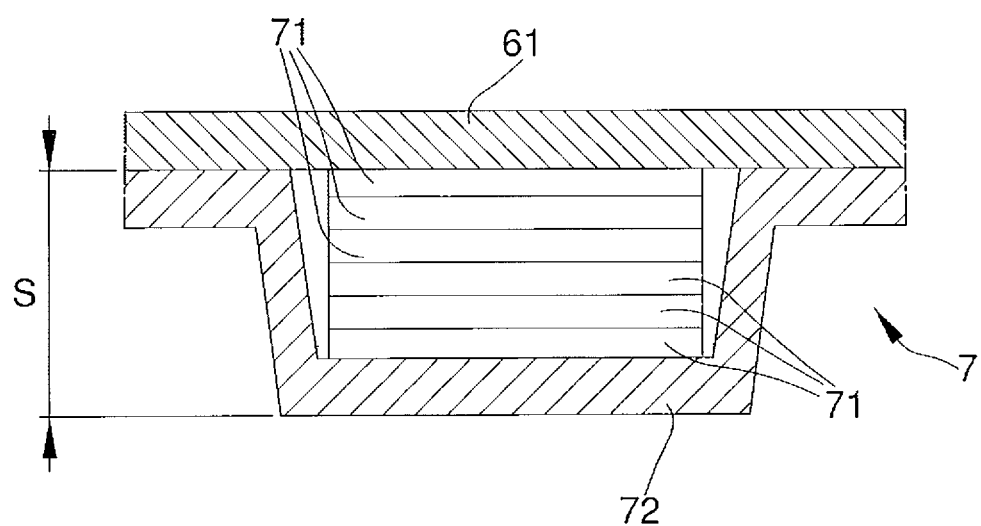
FIG. 7 shows a detailed view of a component of the pressing device.

In a particularly advantageous embodiment illustrated in FIG. 7, the compensating element (7) comprises a plurality of strips (71) superposable on one another in a variable number, for varying the thickness (S) of the compensating element. It is obviously possible also to modify the length and/or the width of the strips (71), for compensating a greater number of different formats of the load (L).

The compensating element preferably comprises a casing (72) structured so as to removably contain the strips (71), which strips (71) are superposed on one another in a variable number. The casing (72) can be for example in the form of a pocket realised in a flexible material and/or an elastic material.

Figure 2:
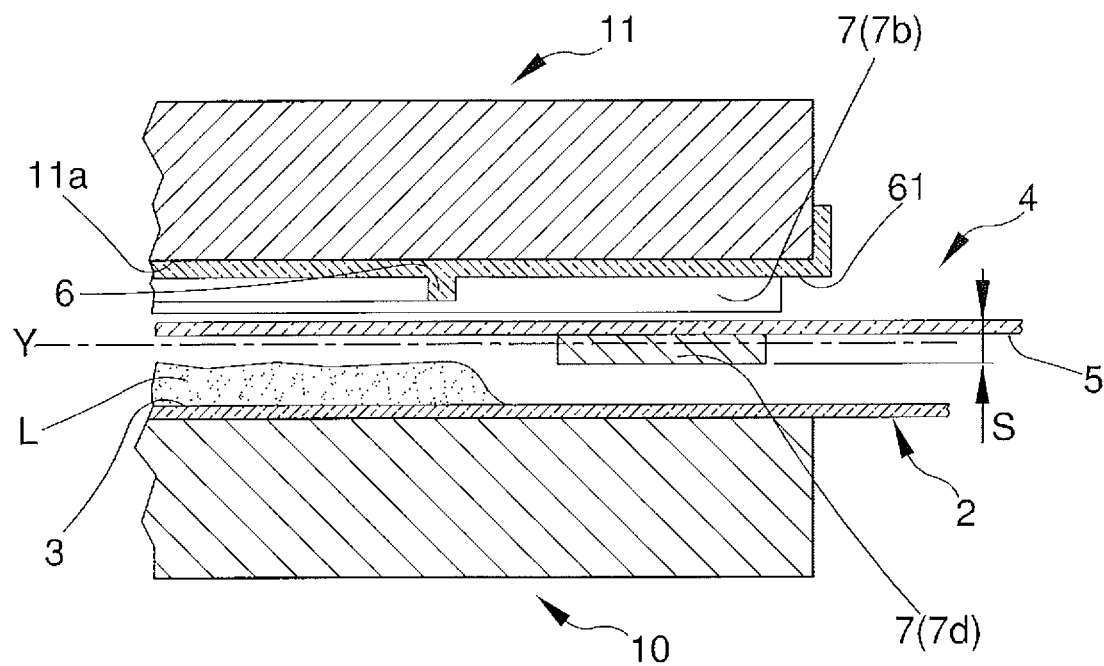
FIG. 2 shows a zone of the device of FIG. 2 in an enlarged scale.
Figure 3:
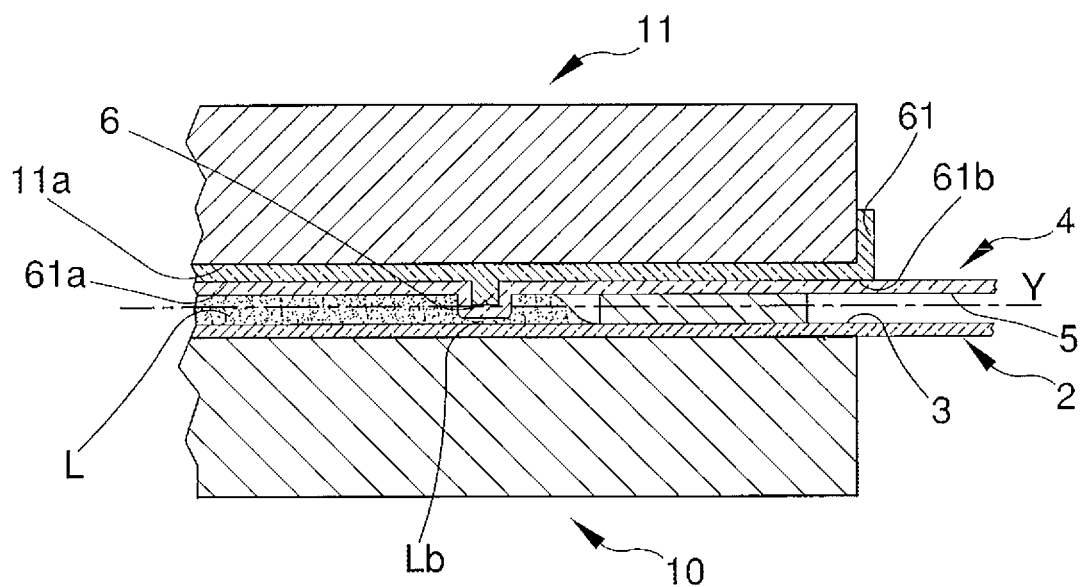
FIG. 3 shows the zone of FIG. 2 in a pressing step.
Figure 4:
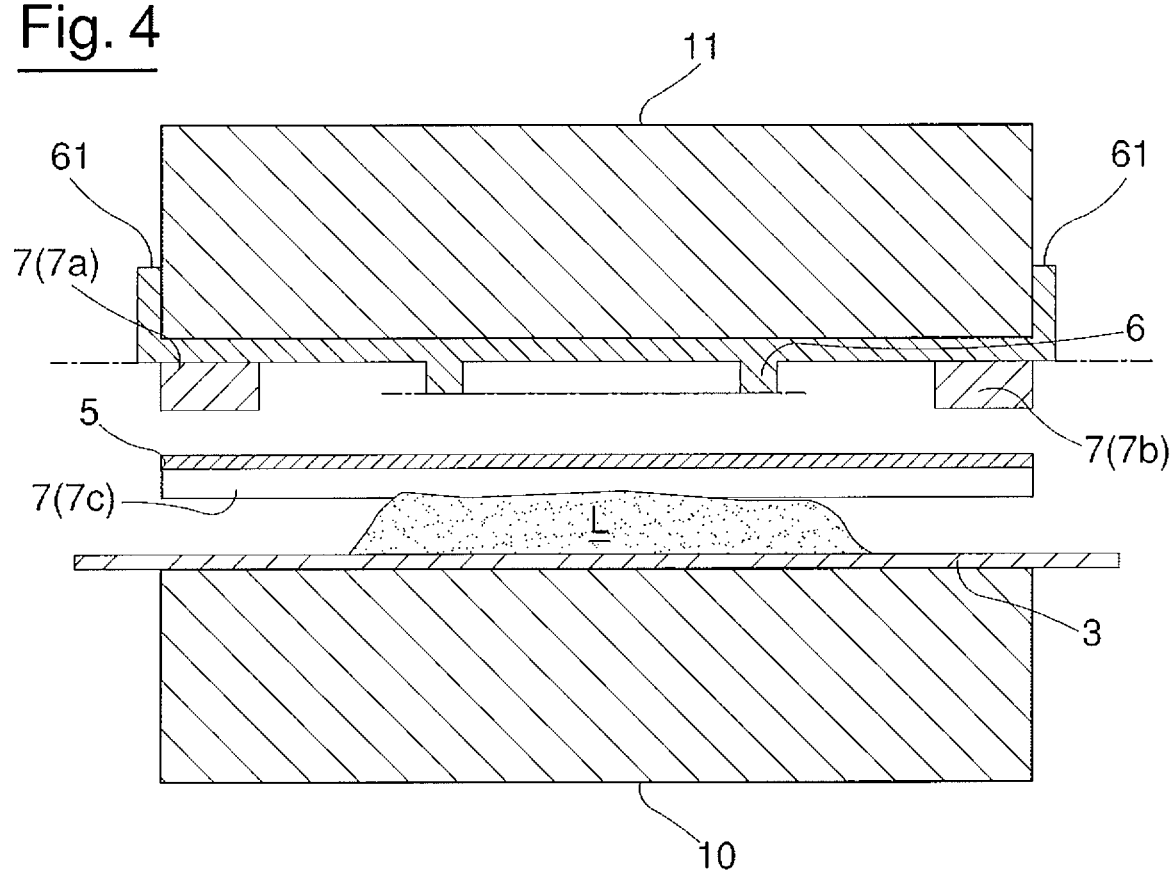
FIG. 4 shows a section according to plane A-A of FIG. 1.
Figure 5:
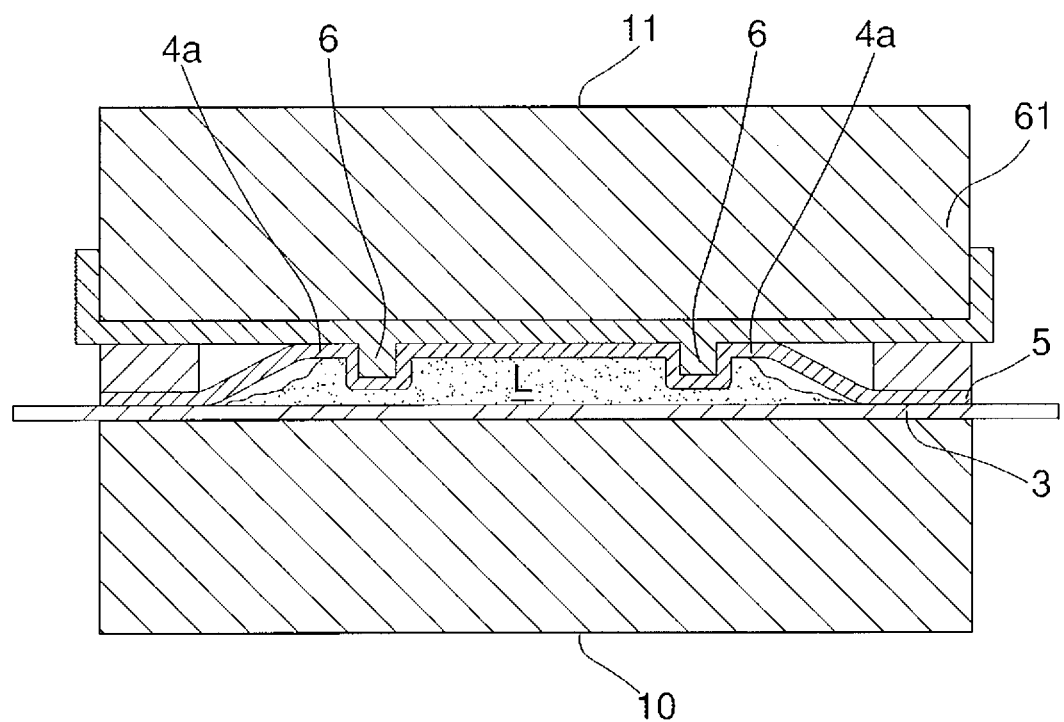
FIG. 5 shows the device of FIG. 4 in a pressing step.

In a possible embodiment, the compensating element (7) is interposed between the upper punch (11) and the active portion (5) of the second movable belt (4), as can be seen in particular in FIGS. 1, 2 and 4. For example the compensating element (7) can be associated to a support (61) applicable to the upper punch (11). In particular, the casing (72) is associated to the support (61) in a permanent or removable way. In turn, the support (61) is removably associable to the upper punch (11). This allows to arrange various compensating elements (7) having different configurations, easily mutually replaceable in relation to the format of the load (L) to be pressed.

In the embodiment illustrated in figures from 1 to 6, the compensating element (7) is at least partly interposed between the upper punch (11) and the active portion (5) of the second movable belt (4). The compensating element (7) comprises two longitudinal elements ($7a$, $7b$) which are parallel to the advancement direction (Y). The compensating element (7) is useful for the pressing of a load (L) provided with a smaller width than the maximum width that is pressable by the punches (10.11). In this embodiment the load (L) is substantially in the middle of the two longitudinal elements ($7a$, $7b$).

The compensating element (7) might further comprise one or two transverse elements ($7c$, $7d$), arranged so as to compensate a possible reduction in length of the load (L) with respect to the maximum length pressable by the punches (10, 11).

Figure 8:
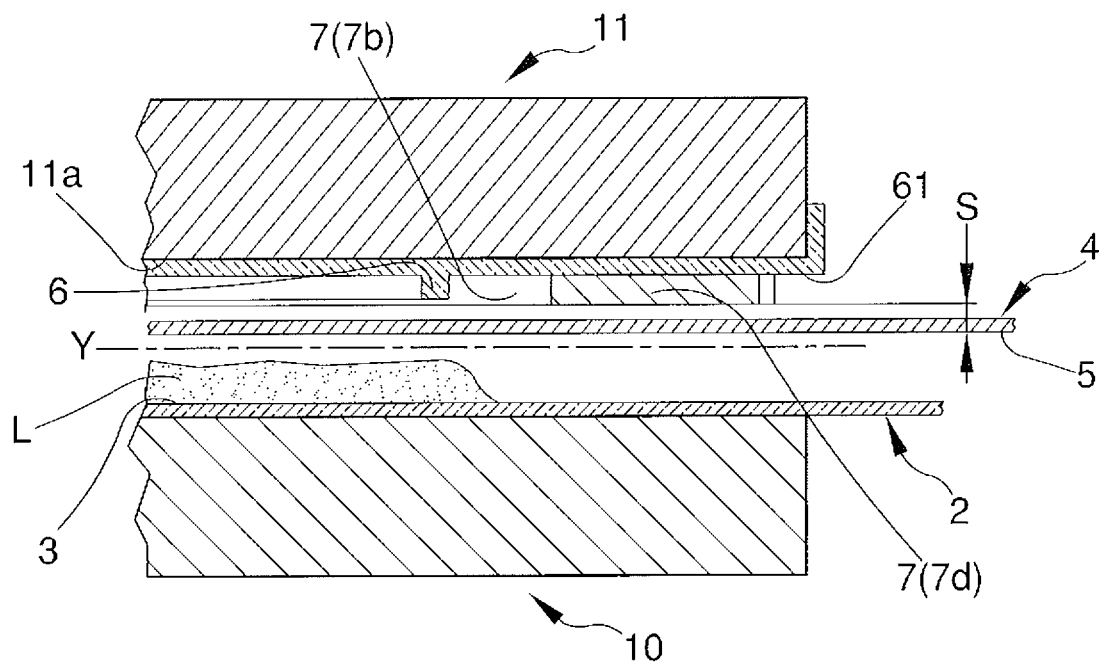
FIGS. 8 and 9 show a further embodiment of the device according to the present invention, seen in cross-section on a vertical plane containing an advancement direction (Y).
Figure 9:
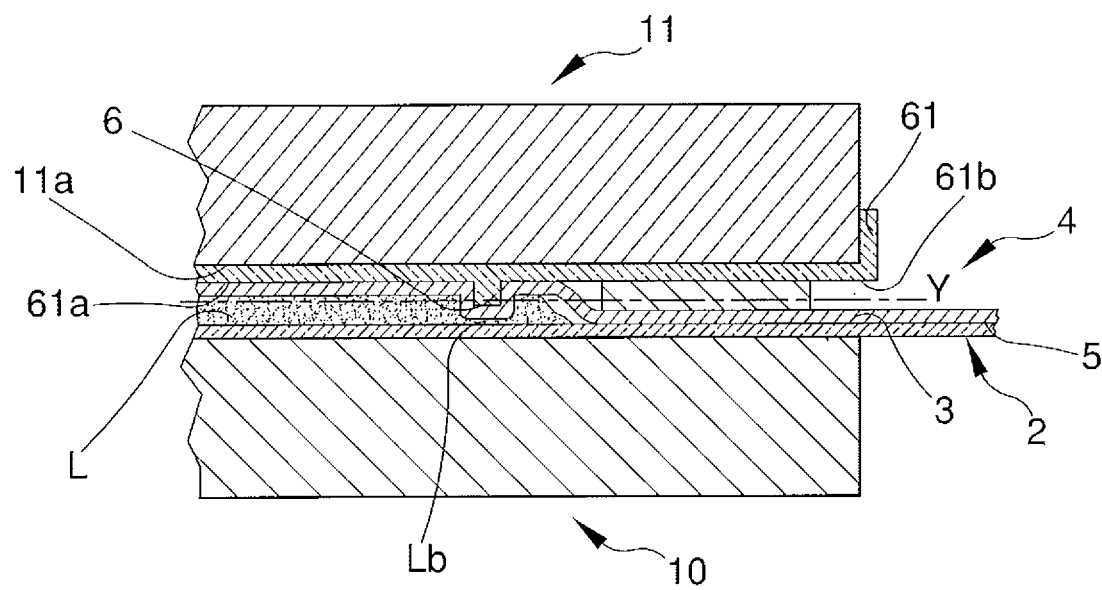

The transverse elements ($7c$, $7d$) might be associated to the support (61), together with the longitudinal elements ($7a$, $7b$), as illustrated in FIGS. 8 and 9. The compensating element (7) might in substance take the form of a frame, defined by the longitudinal elements ($7a$, $7b$) and the transverse elements ($7c$, $7d$) solidly constrained to the support (61) which, possibly, can be connected to one another at ends thereof so as to define a closed frame.

In the embodiment illustrated in figures from 1 to 5, the compensating element (7) comprises two transverse elements ($7c$, $7d$) which are parallel to one another and perpendicular to the advancement direction (Y). The transverse elements ($7c$, $7d$) can be associated to the second belt (4). In particular, various pairs of transverse elements ($7c$, $7d$) can be associated to the second belt (4). The second belt (4) can be positioned, before each pressing step, so as to centre each pair of transverse elements ($7c$, $7d$), with respect to the load (L) to be pressed. Positioning means, within the range of knowledge of the person skilled in the art, can be used for positioning the second belt (4) so that the compensating element (7) is in the correct position for surrounding the load (L) during the pressing step.

In order to facilitate passage about the idler rollers of the second belt (4), each transverse element ($7c$, $7d$) can comprise two or more transverse elements having a smaller width, perpendicular to the advancement direction (Y). The transverse elements are parallel and flanked with respect to one another, but are separated from one another so as to realise transverse elements ($7c$, $7d$) having a greater width (measured parallel to the advancement direction (Y)) which can slide in contact with the idler rollers of the second belt (4) without being subjected to excessive curvatures. On rotating about the idler rollers the transverse elements having a smaller width separate from one another without excessively bending.

The embodiment illustrated in figures from 1 to 5 therefore has a compensating element (7) distributed on two supports, the support (61) and the second movable belt (4). The longitudinal elements ($7a$, $7b$) are preferably associated to the support (61). The transverse elements (7c, 7d) are instead associated to the second movable belt (4), though they might alternatively be associated to the support (61) as illustrated in FIGS. 8 and 9.

Figure 6:
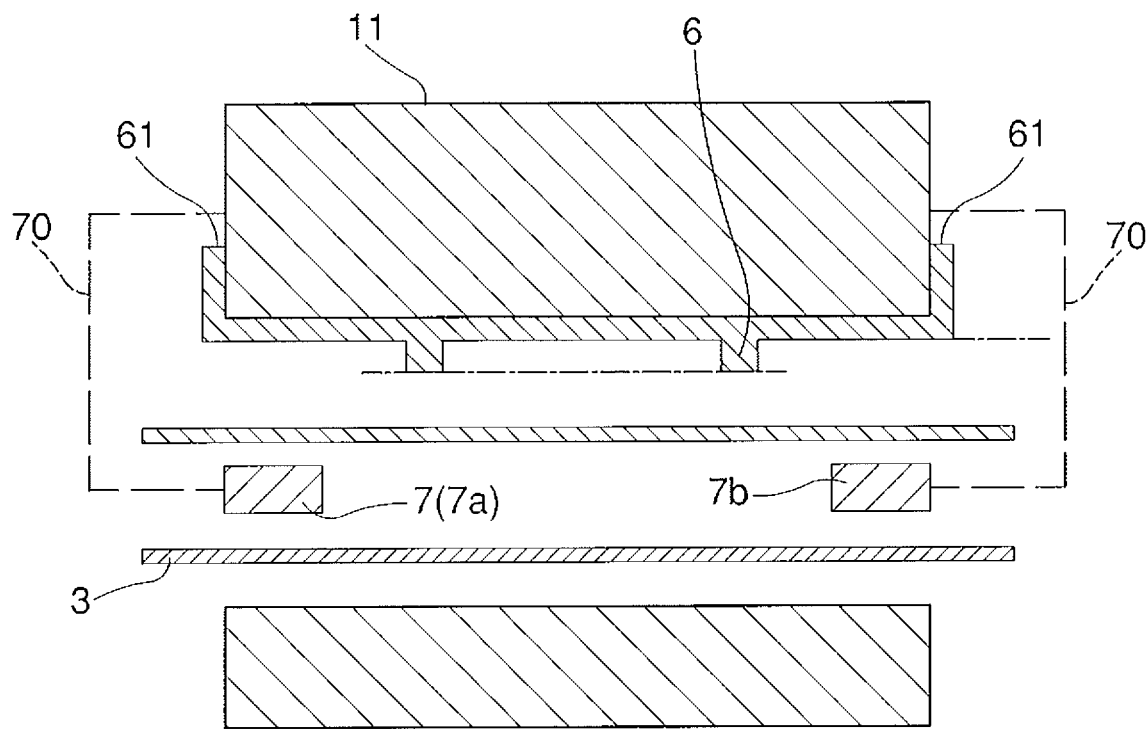
FIG. 6 shows a further variant of the device according to the present invention, seen on a section plane parallel to the plane A-A of FIG. 1.

In a further embodiment, schematically represented in FIG. 6, the compensating element (7) is interposed between the active portions (3, 5) of the first and the second belt (2, 4). In this embodiment the compensating element (7) is associated to the upper punch (11) by means of a suspension device (70) structured so as not to interfere with the movable belts (2, 4). FIG. 6 shows a possible configuration of the suspension device (7) which might comprise two or more arms having a C-shaped structure which extend externally of the active portion (5) of the second movable belt (4).

The support (61) can advantageously be provided with a shaped profile (6), structured for at least partially delimiting a pressing compartment. The shaped profile (6) is destined to protrude inferiorly of the pressing surface (11a) of the upper punch (11), as is the compensating element (7). The shaped profile (6) has a thickness that is smaller than the thickness of the compensating element (7).

As can easily be deduced from FIGS. 2 and 4, and as is known to the person skilled in the art, the shaped profile (6) produces, during the pressing step, a greater compacting of the load (L) in the zone (Lb) underlying the shaped profile (6). This is because during the pressing step the distance between the lower surface of the shaped profile (6) and the pressing surface (10a) of the lower punch (10) is smaller than the distance between the pressing surfaces (10a, 11a) of the two punches (10, 11) in the whole zone where the shaped profile (6) is not present. In substance the material pressed by the shaped profile (6) acquires a greater density.

The shaped profile (6) overall delimits the border of the product, tile or slab, which will be obtained at the end of the production cycle. The zone of the border of the product, pressed by the shaped profile (6), has a greater density and a greater compaction. This facilitates the detaching of the material externally of the border zone, i.e. the material that has not been pressed by the shaped profile (6). The detaching of the external material is carried out in a known way by means of appropriate devices which trim the edge of the product.

The shaped profile (6) is preferably in the shape of a frame which defines a closed border on a plane parallel to the pressing surfaces (10a, 11a) of the punches (10, 11). For example the shaped profile (6) can define a rectangular or square border, but can also be of any other polygonal shape, or an open border or only some sides of the border. The compensating element (7) is arranged externally of the shaped profile (6), i.e. the perimeter delimited by the compensating element (7) surrounds the shaped profile (6).

The compensating element (7), the support (61) and the shaped profile (6) if present, are preferably made of a flexible material, for example of a type usable for realising conveyor belts or the like. The support (61) can for example be in the form of a flexible mat to which the compensating element (7) and possibly the shaped profile (6) are applied. The fixing of the support (61) to the upper punch (11) can be done by means of devices of various nature within the range of knowledge of a person skilled in the art. For example, the support (61) can be detachably constrained to lateral surfaces of the upper punch (11) by means of removable devices positioned along peripheral or border zones of the support (61). The flexibility of the support (61) facilitates the mounting and demounting operations of the upper punch (11).

The invention claimed is:

1. A pressing device, comprising:
   a lower punch (10) and an upper punch (11), at least one of which, during an operation of the pressing device of pressing a layer (L) of ceramic material of a given thickness (T), is mobile nearingly and distancingly with respect to the other;
   a first movable belt (2), comprising an active portion (3) which is mobile along an advancement direction (Y) and at least partially arranged between the upper punch (11) and the lower punch (10);
   a second movable belt (4), comprising an active portion (5) movable along the advancement direction (Y) and at least partially arranged between the first movable belt (2) and the upper punch (11);
   characterised in that the pressing device comprises a compensating element (7) of a given thickness (S), the compensating element (7) being configured and arranged and located in the pressing device such that, during a pressing, the compensating element (7) is located in a position in opposition to the punches (10,11) and in a zone not occupied by the layer (L) of ceramic material; and wherein the compensating element (7), during the pressing, operates as a spacer to keep a portion of the lower punch (10) spaced apart from a portion of the upper punch (11) by a preselected distance.

2. The pressing device according to claim 1, wherein the compensating element (7) is interposed between the upper punch (11) and the lower punch (10) so as to be arranged, during the pressing, in contact with the punches (10, 11).

3. The pressing device according to claim 1, wherein the compensating element (7) has a variable thickness (S).

4. The pressing device according to claim 1, wherein the compensating element (7) comprises a plurality of strips (71) superposable on one another in a variable number, for varying the thickness (S) of the compensating element.

5. The pressing device according to claim 4, wherein the compensating element comprises a casing (72) which is so structured as to removably contain the strips (71), which strips (71) are superposed on one another in a variable number.

6. The pressing device according to claim 1, wherein the compensating element (7) is interposed between the upper punch (11) and the active portion (5) of the second movable belt (4).

7. The pressing device according to claim 1, wherein the compensating element (7) is associated to the upper punch (11).

8. The pressing device according to claim 1, wherein the compensating element (7) is associated to a support (61) which is removably associable to the upper punch (11).

9. The pressing device according to claim 8, wherein the support (61) comprises a shaped profile (6) which is structured so as to at least partially delimit a pressing compartment, said shaped profile (6) being arranged internally of the perimeter delimited by the compensating element (7).

10. The pressing device according to claim 1, wherein the compensating element (7) is associated with the second movable belt (4) and is solidly mobile with the second movable belt (4).

11. The pressing device according to claim 1, wherein the compensating element (7) comprises two longitudinal elements (7a, 7b) which are parallel to one another and parallel to the advancement direction (Y).

12. The pressing device according to claim 1, wherein the compensating element (7) comprises two transverse elements (7c, 7d) which are parallel to one another and perpendicular to the advancement direction (Y).

13. The pressing device according to claim 1, wherein the compensating element (7), during the pressing, is located between the portion of the lower punch (10) and the portion of the upper punch (11).

14. The pressing device according to claim 13, wherein the compensating element (7), during the pressing, is in contact with at least one of the punches (10, 11).

15. A format compensator for a pressing device, characterized in that the format compensator comprises a compensating element (7) of a given thickness (S), structured so as to be interposed between a lower punch and an upper punch (10,11) of a pressing device, so as to be arranged, during a pressing, in opposition to the punches (10, 11), wherein the compensating element (7) comprises a plurality of strips (71) superposable on one another in a variable number, for varying the thickness (S) of the compensating element (7); wherein the compensating element (7) comprises a casing (72) which is so structured as to removably contain the strips (71), which strips (71) are superposed one above another in a variable number.

16. The compensator according to claim 15, comprising a support (4, 61) to which the compensating element (7) is connected, which is removably associated to the upper punch (11) of the pressing device.

17. The compensator according to claim 16, wherein the support (61) comprises a shaped profile (6) structured so as to at least partially delimit a pressing compartment, said shaped profile (6) being arranged inside a perimeter delimited by the compensating element (7).

* * * * *